United States Patent
Mysore et al.

(10) Patent No.: US 12,095,257 B2
(45) Date of Patent: Sep. 17, 2024

(54) CONTROLLING AN INVERTER TO EMULATE SYNCHRONOUS GENERATOR UNDER FAULT CONDITIONS

(71) Applicant: Regents of the University of Minnesota, Minneapolis, MN (US)

(72) Inventors: Pratap Gopal Mysore, Plymouth, MN (US); Daniel Kelly, St. Paul, MN (US); Ned Mohan, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 17/917,112

(22) PCT Filed: Mar. 24, 2021

(86) PCT No.: PCT/US2021/023963
§ 371 (c)(1),
(2) Date: Oct. 5, 2022

(87) PCT Pub. No.: WO2021/206911
PCT Pub. Date: Oct. 14, 2021

(65) Prior Publication Data
US 2023/0155371 A1    May 18, 2023

Related U.S. Application Data

(60) Provisional application No. 63/008,372, filed on Apr. 10, 2020.

(51) Int. Cl.
*H02H 7/122*    (2006.01)
(52) U.S. Cl.
CPC ................................ *H02H 7/1227* (2013.01)
(58) Field of Classification Search
CPC ........................................... H02H 7/122–1227
See application file for complete search history.

(56) References Cited

U.S. PATENT DOCUMENTS

| | | |
|---|---|---|
| 2003/0090257 A1 | 5/2003 | Howes |
| 2011/0153113 A1 | 6/2011 | Harnefors |
| (Continued) | | |

FOREIGN PATENT DOCUMENTS

EP    0235479 A1    9/1987

OTHER PUBLICATIONS

P. Rodriguez, A. V. Timbus, R. Teodorescu, M. Liserre and F. Blaabjerg, "Flexible Active Power Control of Distributed Power Generation Systems During Grid Faults," in IEEE Transactions on Industrial Electronics, vol. 54, No. 5, pp. 2583-2592, Oct. 2007, doi: 10.1109/TIE.2007.899914. (Year: 2007).*

(Continued)

*Primary Examiner* — Peter M Novak
(74) *Attorney, Agent, or Firm* — Steven M. Kochler; Westman, Champlin & Koehler, P.A.

(57) ABSTRACT

A method is provided for operating an inverter of an inverter-based power resource providing electric power to a grid through one or more transformers. The method includes measuring voltages associated with terminals on a selected primary winding and/or measuring voltages associated with terminals on a selected secondary winding; and injecting currents into the primary terminals of the selected primary winding during a fault condition based on the measured voltages being indicative of the type of fault occurring. Preferably the inverter is operated to emulate at least some characteristics of fault currents provided by a generator having rotating magnets or electrical windings. An apparatus is configured to operate in accordance with the method and includes an electrical switching device circuit having input terminals for an inverter-based power resource and output terminals for providing AC electric power to an electric power grid. An inverter controller operates the electrical switching device circuit.

18 Claims, 6 Drawing Sheets

(56) References Cited

U.S. PATENT DOCUMENTS

2012/0086459 A1* 4/2012 Kim .................... G01R 31/086
                                                        324/525
2018/0269013 A1    9/2018 Thompson et al.

OTHER PUBLICATIONS

Y. Ma, W. Cao, L. Yang, F. Wang and L. M. Tolbert, "Virtual Synchronous Generator Control of Full Converter Wind Turbines With Short-Term Energy Storage," in IEEE Transactions on Industrial Electronics, vol. 64, No. 11, pp. 8821-8831, Nov. 2017 (Year: 2017).*

T. Yueh, T.-W. Tsai, Y.-M. Chen, Y.-D. Lee and Y.-R. Chang, "The reverse zero-sequence current compensation strategy for back-to-back active power conditioners," 2016 IEEE Energy Conversion Congress and Exposition (ECCE), Milwaukee, WI, USA, 2016, pp. 1-6, doi: 10.1109/ECCE.2016.7855509. (Year: 2016).*

Banaiemoqadam et al. "A Control-Based Solution for Distance Protection of Lines Connected to Converter-Interfaced Sources During Asymmetrical Faults", IEEE Transactions on Power Delivery, Jun. 2020, pp. 1455-1466, vol. 35, No. 3.

Kelly et al. "A Novel Control Scheme for Utility-Scale Inverter-Based Resources to Emulate Synchronous Generator Fault Response and Retain Existing Protection Infrastructure", 2021, 74th Conference for Protective Relay Engineers (CPRE), 2021, pp. 1-7.

Mohan, N. "Advanced Electric Drives: Analysis, Control, and Modeling Using MATLAB/Simulink", Aug. 2014, pp. 119-129, Wiley, ISBN: 978-1-118-48548-4.

Mohan, N. "Power Electronics: A First Course", Oct. 2011, pp. 204-207, Wiley, ISBN: 978-1-118-07480-0.

Yazdani, A. and Iravani, R. "Voltage-Sourced Converters in Power Systems: Modeling, Control, and Applications", Feb. 2010, pp. 345-346, Wiley—IEEE Press, ISBN: 978-0-470-52156-4.

International Search Report and Written Opinion in corresponding International Patent Application No. PCT/US2021/023963 dated Aug. 12, 2021.

* cited by examiner

CONTROLLING AN INVERTER TO EMULATE SYNCHRONOUS GENERATOR UNDER FAULT CONDITIONS

CROSS-REFERENCE TO RELATED APPLICATION(S)

This Application is a Section 371 National Stage Application of International Application No. PCT/US2021/023963, filed Mar. 24, 2021 and published as WO 2021/206911, on Oct. 14, 2021, in English, and further claims priority to U.S. provisional patent application Ser. No. 63/008,372, filed Apr. 10, 2020, the contents of which are hereby incorporated by reference in their entirety.

GOVERNMENT FUNDING

This invention was made with government support under ECCS1936560 awarded by the National Science Foundation. The government has certain rights in the invention.

BACKGROUND

The discussion below is merely provided for general background information and is not intended to be used as an aid in determining the scope of the claimed subject matter.

Utility-scale renewable resources, such as electric power derived from photovoltaics (PVs) and wind are increasingly common because they are becoming more economical. However, the utility-scale resources are often located in places far away from load centers. This requires that electricity from utility-scale renewable resources be transmitted over long distances through new transmission lines and/or existing transmission lines making up the existing power system grid.

Protection relays are well known and are used throughout the power system grid to protect equipment from damage when a fault occurs. Referring to FIG. 1, a transmission line 10 includes two sections 12, 14 that are each defined by circuit breakers 12A. 12B and 14A. 14B respectively. In general, protective relays operate circuit breakers to isolate a fault when it occurs on the transmission line 10 and prevents large, possibly unbalanced, currents to flow in the power system.

One form of protective relay is known as a distance relay. Distance relays detect faults by calculating impedance from voltages and currents measured at the location of the relay. Each distance relay operates a circuit breaker to disconnect the transmission line if the calculated impedance is less than a pre-set value. In FIG. 1, distance relays are illustrated at 13A. 13B. 15A and 15B operatively connected to circuit breakers 12A, 12B, 14A and 14B, respectively.

Distance relays use the phase relationship between voltages and currents to determine the fault direction, i.e., whether the fault is on the transmission line in the forward direction or behind the relay. Under normal load flow conditions, the voltage at the relay will be close to the normal operating voltage, and the current flowing on the line would be proportional to the loads connected. The impedance calculated would be close to the load impedance. Such an impedance (voltage to current relationship) does not cause the relay to operate the associated circuit breaker. However, a fault (short-circuit to ground on one or more phases or between two or more phases) on transmission-line sections 12 or 14 causes a dip in voltage and increase in current at the relay location. The calculated impedance, as seen by the relay, decreases from the load impedance to an impedance of the transmission line from the relay location up to the fault point. The transmission line is known to have a certain impedance per unit distance. From the calculated impedance, it is possible for the relay to calculate the location of the fault.

The distance relay can have one or more zones of protection. If the relay determines that the fault is within its protection zone(s) (i.e., within the specified impedance value), it will operate and control the circuit breaker so as open. As illustrated in FIG. 1, each section 12, 14 of the transmission line 10 has relays 13A, 13B. 15A and 15B at either end that will isolate the transmission line section (that portion between the circuit breakers) in case of a fault. Each of the distance relays 13A. 13B, 15A and 15B typically has a zone of protection ("zone 1") that is less than the complete length of the corresponding section 12, 14 (herein identified as 85% of the length of the section 12). If a fault 24 were to occur on the section 12 at a point that falls in "zone 1" of relay 13A and "zone 1" of relay 13B (herein also set at 85% of the length of section 12), each of relays 13A and 13B would operate their corresponding circuit breakers 12A and 12B to isolate the fault.

For redundancy, each end of the transmission line sections 12, 14 has a second zone of protection, provided by the same relay having the zone 1 protection and/or a second distance-based relay depending on the type of redundancy required. The second zone of protection ("zone 2") is longer than the length of the transmission line section 12, 14 it is protecting. In this manner, if a fault were to occur in section 14 at 25, and relay 15A did not operate circuit breaker 14A, the zone 2 protection setting (herein provided by relay 13A) for circuit breaker 12A would operate circuit breaker 12A to open the transmission line 10 and prevent the flow of current from left in FIG. 1. Commonly, a delay is provided for zone 2 protection so that circuit breaker 12A would not be opened right away for fault 25 so as to allow relay 15A to operate circuit breaker 14A since the fault 25 occurs in its "zone 1" protection.

In modern microprocessor-based relays, the magnitude of the impedance is determined by the ratio of voltage and current. To determine the direction of the fault, the phase relationships between voltages and currents are used. Most distance-based relays make use of phase relationship between negative-sequence voltages and currents which are present only during an unbalanced fault (e.g., Single Line to Ground, Double Line to Ground and Phase-to-Phase). Phase relationships between zero-sequence voltages and currents (generated only during single line or double line to ground faults) were also used in relays, but the use of negative-sequence voltages and currents are preferred due to issues with mutual coupling faced with zero-sequence quantities.

It should be noted another form of relay protection for transmission lines includes the use of current-differential relays. Current differential relays compare the magnitude and phase angle of currents at both ends of the transmission line. These relays require a dedicated communication channel to exchange information between two ends. These relays do not provide backup protection to adjacent line sections, unlike the distance relays.

Prior to the advent of renewable resources, electric power was derived from generators having a rotating armature driven by a prime mover powered by steam or water. In the case of steam, the steam can be produced by fuels such as coal, gas or nuclear. During faults, conventional synchronous generators result in large fault current magnitudes (5-6 times the normal load currents), which by itself is not important for distance-based relays. However, they also produce negative-sequence voltages and currents and their phase relationship is used for their proper operation.

Renewable resource based power sources do not have rotating armatures directly connected to the power system grid. Rather, these power sources directly, such as the case with PVs, or indirectly, such as the with wind power generators, produce DC power that is then converted to AC power using inverters at the power system grid frequency. As such these renewable resource based power sources can be referred to as inverter-based resources (IBRs). However, as presently controlled. IBRs behave very differently from the synchronous generators during a fault. IBRs can provide only slightly more than the rated current even during faults, and as a result, a change in current magnitude is not sufficient to recognize the faulted condition. Also, IBRs are controlled to generate balanced currents even during unbalanced faults, which makes fault identification using negative-sequence components ineffective, thereby rendering distance relays ineffective.

As the number of IBRs on the power system grid increases, the overall available fault current magnitude and sequence components decrease since less high fault current generating rotating generators are present, leading to the possibility of relays failing to detect and isolate faults reliably.

Some believe that up to 30% power from IBRs on the power system grid may not have a significant impact on the performance of the existing relays on the power system grid. However, several governmental bodies have mandated much higher percentage of power on the power system grid must come from IBRs in the near future. If conventional control schemes are used for utility-scale inverters, distance protection schemes on the power system will fail to reliably detect faults. Although current differential relays would operate correctly for fault currents provided from IBRs, this would entail that much of relay protection of the power system would to be changed due to the prevalence of distance relay protection now employed. In view of the communication channels needed for current differential relays, the costs of such a change would be great. However, even if employed, protection is compromised because of the reliance on the proper operation of the communication channels. Even where current differential relays are now employed, commonly distance relay protection is also provided for redundancy.

SUMMARY

One general aspect includes a method of operating an inverter of an inverter-based power resource providing electric power to an electric power grid at normal operating voltages through one or more transformers. The method of operating includes measuring voltages associated with terminals on a selected primary winding and/or measuring voltages associated with terminals on a selected secondary winding; and injecting currents into the primary terminals of the selected primary winding during a fault condition on the power grid to emulate at least some characteristics of fault currents provided by a generator having rotating magnets or electrical windings based on measured voltages being voltages associated with terminals on the selected primary winding and/or voltages associated with terminals on the selected secondary winding.

Another general aspect includes a method of operating an inverter of an inverter-based power resource providing electric power to an electric power grid at normal operating voltages through one or more transformers. The method of operating includes measuring voltages associated with terminals on a selected primary winding and/or measuring voltages associated with terminals on a selected secondary winding; and injecting currents into the primary terminals of the selected primary winding based on measured voltages being characteristic of a fault occurring on the electrical grid connected to the secondary winding being one of a phase to ground fault, a phase-to-phase fault, a double-phase to ground fault or a three phase fault.

Yet another general aspect includes a method of operating an inverter of an inverter-based power resource providing electric power to an electric power grid at normal operating voltages of 1.0 per unit through one or more transformers. The method of operating includes measuring voltages associated with terminals on a selected primary winding and/or measuring voltages associated with terminals on a selected secondary winding; and controlling the inverter to inject currents into the primary terminals during a fault condition on the power grid to emulate at least some characteristics of fault currents provided by a generator having rotating magnets or electrical windings based on the measured voltages across each pair of terminals on the selected primary winding and/or measured voltages on each secondary terminal on the selected secondary winding.

Any of the foregoing methods and may include ascertaining the fault being one of one of a phase to ground fault, a phase-to-phase fault, a double-phase to ground fault or a three phase fault, while measuring may include measuring and storing in memory as pre-fault measured voltages of the measured voltages a magnitude and a phase angle of voltages associated with terminals on the selected primary winding and/or voltages associated with terminals on the selected secondary winding before an occurrence of the fault, and measuring as fault measured voltages of the measured voltages magnitude of voltages associated with terminals on the selected primary winding and/or voltages associated with terminals on the selected secondary winding during the occurrence of the fault condition. Injecting currents may include injecting currents into each of the primary terminals by adjusting magnitude and phase angle of each injected current with respect to the phase angle of the associated pre-fault measured voltage. Storing may include storing pre-fault measured in an inverter controller controlling an electrical switching device circuit or storing may include storing pre-fault measured voltages on a device separate from an inverter controller controlling an electrical switching device circuit. Injecting currents may include waiting a selected time period upon detection of a drop in at least one of the measured voltages. This is advantageous so that time is allowed for the measured voltages to accurately reflect the fault that is occurring so that the injected currents match the type of fault occurring. The selected time period can be in the range of ½ to 2 cycles, although about one cycle may be sufficient.

Controlling the inverter or the injected currents may include: if one of the phase-to-phase voltages across one associated pair of primary terminals is below a primary voltage selected level relative to another phase-to-phase voltage across other primary terminals, or one of the phase-to-ground voltages on the secondary terminals is below a secondary voltage selected level relative to another phase-to-ground voltage on another secondary terminal thereby causing said one of the phase-to-phase voltages being below the primary voltage selected level, controlling the inverter or injecting currents in primary terminals of said one of the phase-to-phase voltages that are 180 degrees out of phase. The primary voltage selected level is at least less than 0.9 per unit. In a further embodiment, the primary voltage selected level is at least less than 0.8 per unit. A phase angle of the current injected in the associated primary terminal of a leading phase for said one of the phase-to-phase voltages can be adjusted to lag a pre-fault voltage of said one of the phase-to-phase voltages by a line angle of the power grid. The current injected in the first non-common terminal and the second non-common terminal is equal to or less than about 0.5 per unit. The lower magnitude currents are injected out of phase with a phase-to-phase voltage that is greater than about the primary terminal selected voltage The lower magnitude currents are about 0.5 pu, while the other current is about 1.0.

Controlling the inverter or the injected currents may include: if two of the phase-to-phase voltages across associated pairs of primary terminals are each below a primary voltage selected level relative to another phase-to-phase voltage, or two phase-to-ground voltages on the secondary terminals are below a secondary voltage selected level relative to another phase-to-ground voltage on the secondary terminals thereby causing said two of the phase-to-phase voltages across associated pairs of primary terminals to each be below the primary voltage selected level relative to another phase-to-phase voltage, where the associated pairs of primary terminals may include a common terminal, a first non-common terminal and a second non-common terminal, controlling the inverter to inject current into the common terminal being out of phase and equal to at least a sum of the current injected into the first non-common terminal and second non-common terminal. The primary voltage selected level is less than about 0.9 per unit. The primary voltage selected level is less than about 0.8 per unit, or the secondary voltage selected level is about 0.5 per unit, or said two phase-to-ground voltages on the secondary terminals are in phase. The current injected in the first non-common terminal is substantially equal to the current injected into the second non-common terminal. The current injected in the common terminal is equal to or less than about 1.0 per unit. Controlling the inverter or injecting currents may include: if all phase-to-phase voltages across associated primary terminals is below a primary voltage selected level relative to 1.0 per unit, or all phase-to-ground voltages on the secondary terminals is below a secondary voltage selected level relative to 1.0 per unit thereby causing all of the phase-to-phase voltages being below the primary voltage selected level, controlling the inverter to inject currents in terminals of the selected primary winding that are substantially equal and 120 degrees apart. Said currents in terminals of the selected primary winding may lag behind respective pre-fault phase voltage angles by a line angle of the power grid due to the fault condition, although an appropriate phase shift due to winding configuration of transformer(s) may also need to be considered.

Yet another general aspect includes an apparatus implementing any of the foregoing methods. The apparatus includes an electrical switching device circuit having input terminals for an inverter-based power resource and output terminals for providing multi-phase ac electric power to an electric power grid; and an inverter controller connected to the electrical switching device circuit to operate the electrical switching device circuit to emulate at least some characteristics of fault currents being one of a phase to ground fault, a phase-to-phase fault, a double-phase to ground fault or a three phase fault.

The apparatus can be configured such that the fault currents emulate at least some characteristics of a generator having rotating magnets or electrical windings providing the fault currents. The apparatus and may include a system controller connected to the inverter controller having voltage input terminals. The system controller is configured to control the inverter controller based on voltages provided at the voltage input terminals. The voltage input terminals may include three phase voltage input terminals. The system controller is configured to control the inverter controller based on voltages at the voltage input terminals corresponding to one of a phase to ground fault, a phase-to-phase fault, a double-phase to ground fault or a three phase fault on a power system connected to the output terminals. The system controller is configured to control the inverter controller to adjust one or more phase currents from the electrical switching device circuit during the fault condition on the power grid. Adjusting one or more phase currents may include adjusting a magnitude and/or phase angle of the one or more phase currents relative to one or more respective phase voltages from the electrical switching device circuit.

The system controller can be configured to control the inverter controller such that if one of the phase-to-phase voltages across the voltage input terminals is below a primary voltage selected level relative to another phase-to-phase voltage across the voltage input terminals, or one of the phase-to-ground voltages on the voltage input terminals is below a secondary voltage selected level relative to another phase-to-ground voltage on the voltage input terminals, the inverter controller provides currents out of two of the output terminals that are 180 degrees out of phase. The system controller can be configured to control the inverter controller such that if two of the phase-to-phase voltages across associated pairs of the voltage input terminals are each below a primary voltage selected level relative to another phase-to-phase voltage across the voltage input terminals, or two phase-to-ground voltages on the voltage input terminals are below a secondary voltage selected level relative to another phase-to-ground voltage on the voltage input terminals, the inverter controller provides currents out of two of the output terminals that is a sum the current into a remaining terminal of the output terminals. The current provided out of each of the two of the output terminals can be equal. The system controller is configured to control the inverter controller such that if all phase-to-phase voltages across the voltage input terminals is below a primary voltage selected level, or all phase-to-ground voltages on the voltage input terminals is below a secondary voltage, the inverter controller is configured to provide currents that are substantially equal and 120 degrees apart. The inverter controller or the system controller can be configured to delay the operation of the switching devices for a selected time period as discussed above.

DETAILED DESCRIPTION OF ILLUSTRATIVE EMBODIMENTS

Figure 1:
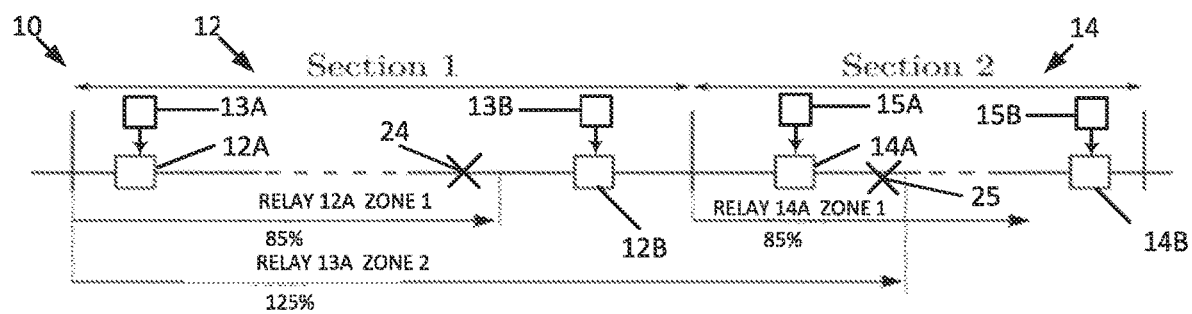
FIG. 1 is a schematic view of a portion of an electrical transmission line showing zones of fault protection.
Figure 2:
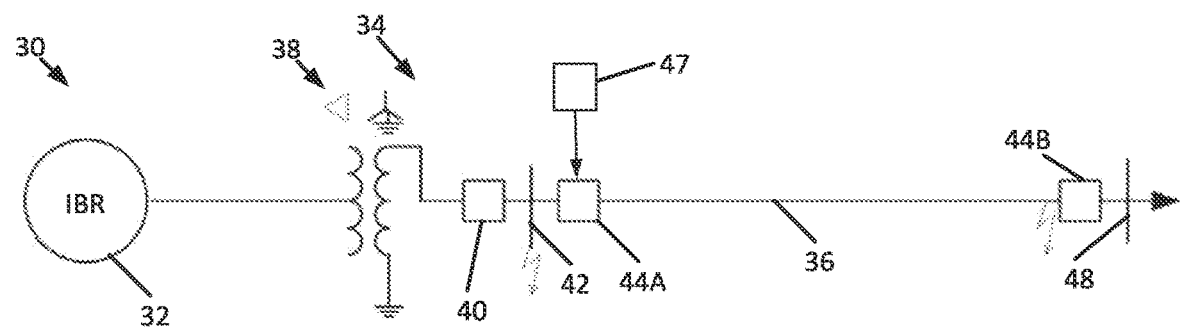
FIG. 2 is a one line diagram of an IBR connected to an electrical grid.

FIG. 2 illustrates a simplified one-line diagram of a system 30 with a single IBR 32. The IBR 32 generates or stores power that is provided to a power system grid 34 via a transmission line 36. Herein IBR 32 represents all such generator and storage systems that have inverters such as but not limited to photovoltaic, wind, energy storage devices such as batteries, flywheels, etc. In addition, IBR 32 is not intended to be interpreted as a single such power source, but one or more of such sources.

In view that the power system grid 34 commonly operates at a voltage level higher than the voltage level provided directly from the IBR 32, at least one step-up transformer 38 is provided connecting the IBR 32 to the transmission line 36. It should be noted FIG. 2 that transformer 38 herein schematically represents the total increase in voltage that occurs to convert the generally low voltage from an IBR such a 480V or 690V to transmission line level voltages. e.g. 230 kv, 345 kV. Commonly, this would entail the use of multiple step-up transformers.

Figure 2A:
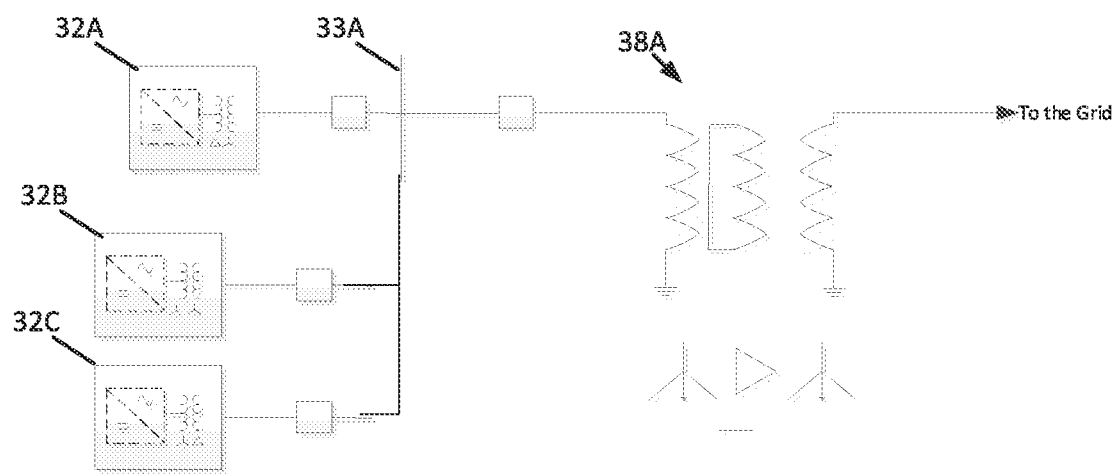
FIG. 2A is a one line diagram of a plurality of IBRs connected to the electrical grid.

FIG. 2A illustrates a typical installation having a plurality of IBRs 32A. 32B and 32C. Each IBR 32A. 32B. 32C includes a transformer that has a secondary winding connected to common bus 33A. FIG. 2A illustrates that the transformer associated with an IBR can be a delta-wye (IBR 32A), a wye-wye (IBR 32B) or a wye-delta (IBR 32C). Each of the transformers step up the voltage from the voltage from the inverter to a distribution voltage level with a primary winding receiving power from the inverter of the IBR and a secondary winding connected to the common bus 33A. The common bus 33A is connected to a primary winding of a collector transformer 38A to convert the distribution level voltage (e.g. 34.5 kV) to a transmission level voltage (e.g. 230 kV and above). In this exemplary embodiment, the configuration of the transformer 38A is Grounded Wye-Grounded Wye-Delta. The Delta winding provides a means for grounding the system.

Referring back to FIG. 2, a circuit breaker 40 is provided to connect the transformer 38 to an electrical bus 42, while circuit breaker 44A connects transmission line 36 to the bus 42, and circuit breaker 44B provided at a remote end of the transmission line 36 connects the transmission line 36 to another electrical bus 48, representing the reminder of the power system grid 34. A protective distance relay 47 is connected to control the operation of at least circuit breaker 44A in the manner as described above. Typically, other forms of protection are employed to control operation of circuit breaker 40 which is not pertinent to the present invention.

Figure 3:
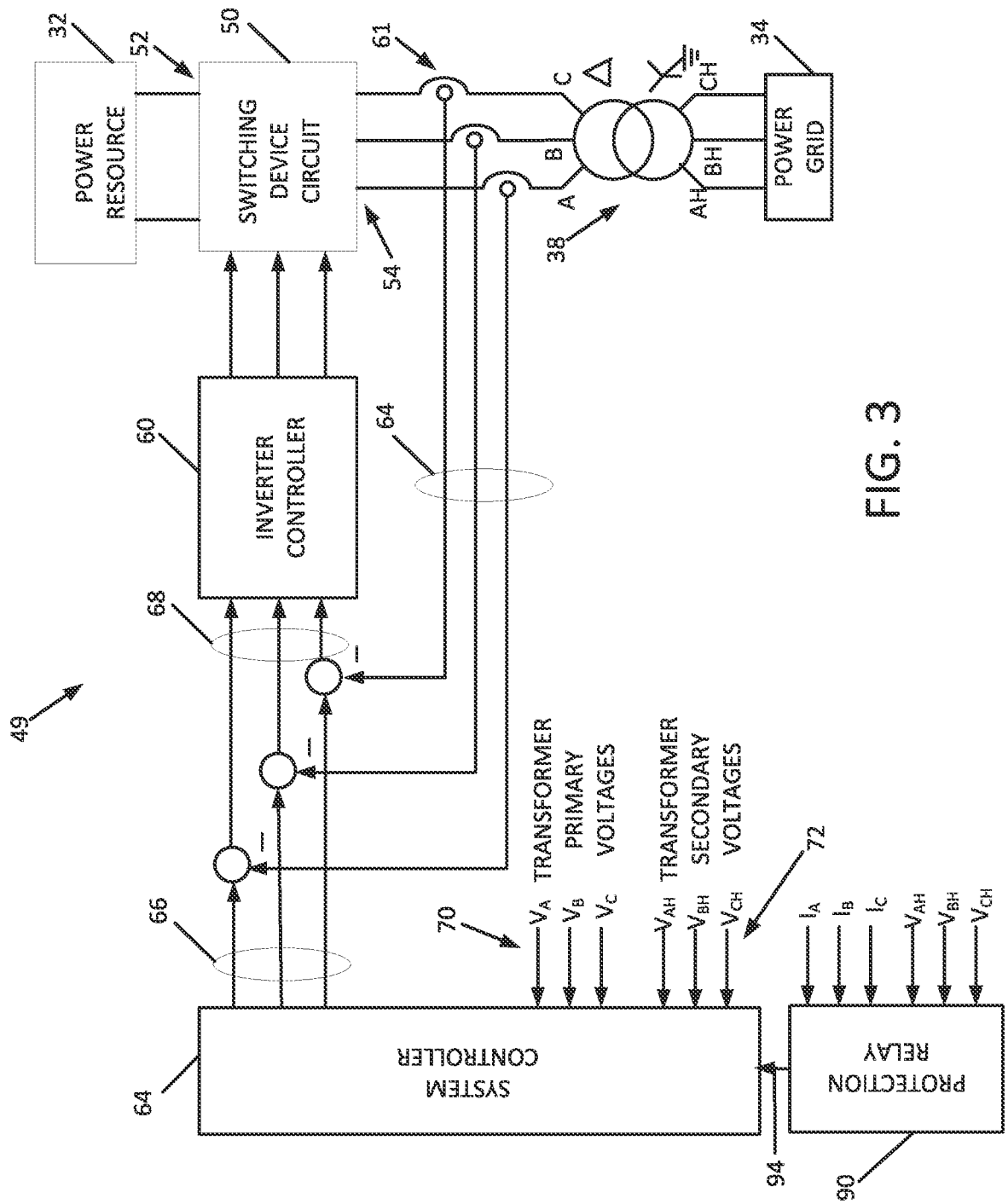
FIG. 3 is a schematic diagram of an inverter connected to the electrical grid.

Referring to FIG. 3, a control circuit or inverter 49 converts the power provided from IBR 32 or other power resource so as to be applied to transformer 38. As is well known in the art the inverter 49 includes an electrical switching device circuit 50 having output terminals 54 connected to the primary winding of transformer 38. The input power to electrical switching device circuit 50 at terminals 52 can be in the form of DC power or AC power. The electrical switching device circuit 50 includes at least an output inverter circuit that converts DC power, if provided at terminals 52, to three phase AC power provided at terminals 54. If the power source 32 provides AC power at input terminals 52, the electrical switching device circuit 50 can include an input rectifier circuit to convert the input power to an internal DC voltage and through a DC voltage linking circuit to the output inverter circuit.

A controller 60 (herein exemplified as an inverter controller) controls operation of at least the inverter output circuit so as to generate multi-phase, commonly three-phase, power that is provided to transformer 38. If the electrical switching device circuit 50 includes an input rectifier circuit having controlled switching devices, controller 60 can provide suitable control signals for rectification, if needed. Commonly, current feedback is used by the controller 60 so as to ensure proper generation of the three phase power. Feedback is schematically represented herein where feedback current signals 64 from current transformers 61 are combined with command current control signals 66 provided by a system controller 64 to provide current command error signals 68 to inverter controller 60 such that the inverter controller 60 will operate the electrical switching device circuit 50 as further described below.

It is important to understand that the concepts discussed below regarding current generation to emulate current characteristics provided by a generator having rotating magnets or electrical windings during fault conditions can be implemented with an inverter under the control of any suitable controller that generates the requisite emulated currents. The goal is to inject the appropriate currents from the inverter which can be accomplished using any now known or used in the future as long as such a future technique generates currents as described herein. For example, one suitable technique controlling current using a hysteretic approach, as illustrated in FIG. 3. However, this should not be considered limiting in that other known linear or non-linear control techniques used for inverter control can be used.

Another suitable control technique is using a dq-based control to inject the desired current. The inverter of such an IBR is controlled using dq transformations, which is a well-known standard technique or procedure to control the inverter. This procedure is used in controlling power and reactive power outputs from the inverters of IBRs under normal operating conditions, as described in "Voltage-Sourced Converters in Power Systems: Modeling, Control, and Applications" (Wiley-IEEE); Amirnaser Yazdani, ISBN-10: 0470521562, which is incorporated by reference in its entirety.

This transformation is also used for controlling the grid-side inverters and the motor-side inverters in electric motor drives as described in Advanced Electric Drives: Analysis, Control, and Modeling Using MATLAB/Simulink. Ned Mohan. ISBN: 978-1-118-48548-4, which is incorporated by reference in its entirety.

Specifically for the present application, as described in "Voltage-Sourced Converters in Power Systems: Modeling. Control, and Applications (Wiley-IEEE); Amirnaser Yazdani, ISBN-10: 0470521562." the required currents to be injected, based on the fault condition, are transformed into id*and iq*, where "*" superscript signifies reference currents. This transformation is implemented using a PLL and a synchronous dq reference frame (could also be some other reference frame), as described in "Voltage-Sourced Converters in Power Systems: Modeling, Control, and Applications (Wiley-IEEE); Amirnaser Yazdani. ISBN-10: 0470521562."

Similarly, the measured currents at the output of the inverter are transformed into id and iq. The errors between the reference and the actual currents in the dq reference frame (with the goal of reducing these errors to zero) act on proportional-integral (PI) controllers, one in each channel, with proper compensation terms. The output of these PI controllers is the desired inverter voltages vd*and vq*in the dq reference frame. Using the inverse of the transformation matrices used earlier, they produce reference voltages va*, vb*and vc*. To obtain these voltages from the inverter, there are standard techniques such as sine-PWM described in "Power Electronics: A First Course by Ned Mohan. Sep. 27, 2011 by Wiley" or space-vector PWM described in "Advanced Electric Drives: Analysis, Control, and Modeling Using MATLAB/Simulink. Ned Mohan, ISBN: 978-1-118-48548-4."

As illustrated in FIGS. 2 and 2A an inverter-based power resource provides electric power to an electric power grid through one or more transformers, each transformer having a primary winding having primary terminals receiving power from the inverter and a secondary winding having secondary terminals providing power to the electric power grid. Generally, the method includes measuring voltages associated with terminals on a selected primary winding of the one or more transformers and/or measuring voltages associated with terminals on a selected secondary winding of the one or more transformers. Currents are injected into primary terminals of the selected primary winding during a fault condition on the power grid to emulate a phase to ground fault, a phase-to-phase fault, a double-phase to ground fault or a three phase fault based on the measured voltages being indicative of such a fault. In a preferred embodiment, the fault currents emulate at least some characteristics of fault currents provided by a generator having rotating magnets or electrical windings based on measured voltages being voltages associated with terminals on the selected primary winding and/or voltages associated with terminals on the selected secondary winding.

It should be understood that although currents originate from the inverter of the IBR and are injected into the primary winding to which it is directly connected, if there exists a second transformer such as illustrated in FIG. 2A that has a primary winding connected to the secondary winding of the transformer directly connected to the inverter, then the primary winding of the second transformer will also have currents injected into it.

In the exemplary embodiment of FIG. 2, the winding configuration of the (step-up) transformer 38 is assumed to have the Y-side leading the delta-side voltage by 30 degrees. All calculations shown below are based on this assumption. Voltages from the output terminals 54 or primary terminals of transformer 38 (or voltage signals indicative of such voltages) are provided to the system controller 64 at 70. If desired, voltages 72 typically indicative of the voltages on the secondary terminals of transformer 38 can also be used in addition or in the alternative to voltages 70. Typically, phase-to-phase voltages are obtained from the voltages 70 and/or phase-to-ground voltages 72 and used for processing. Under normal operating conditions, terminal voltages and the delta-side, phase-to-phase voltages are at the rated nominal value. Phase-to-phase voltages are assumed to be at 1.0 PU. It should be understood that system controller 70 can be used to control one or more controllers 60.

Figure 4:
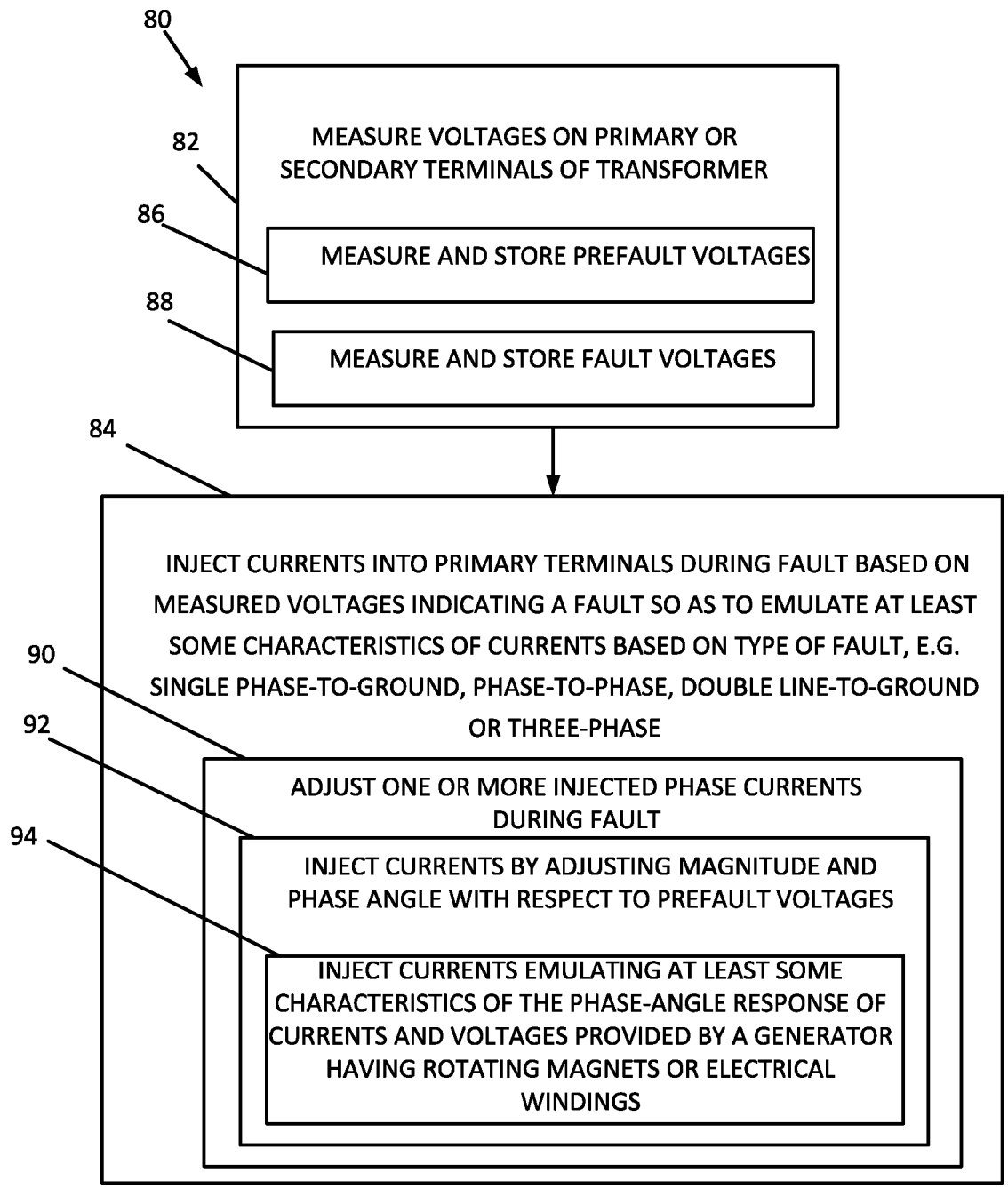
FIG. 4 is a method of operating the inverter of an IBR.

In general as an aspect of the present invention, a method 80 (FIG. 4) for operating an inverter of an inverter-based power resource is provided. Using again FIG. 2 by way of example, at step 82, inverter 49 measures voltages 70 on the primary side of transformer 38 (which correspond to voltages at terminals 54) and/or voltages 72 on the secondary side of transformer 38. If the measured voltages 70, 72 are indicative of a fault on power grid 34, process flow continues to step 84 where currents are injected by inverter 49 so as to emulate a phase to ground fault, a phase-to-phase fault, a double-phase to ground fault or a three phase fault based on the measured voltages being indicative of such a fault. In this manner, all distance protective relays such as relay 47 in FIG. 2 will detect the fault, if occurring in its zone of protection, and control operation of associated circuit breakers to isolate that portion of the power system. It should be noted that method 80 of FIG. 4 only applies for controlling the inverter 49 in FIG. 3 under fault conditions. For non-fault conditions inverter 49 in FIG. 3 operates pursuant to other control algorithms in a manner as desired for the type of IBR 32 connected to the inverter 49. These control algorithms are not pertinent to the invention herein disclosed and as such will not be further discussed.

Step 82 typically will include measuring and storing in memory as pre-fault measured voltages of the measured voltages a magnitude and a phase angle of voltages associated with terminals on the primary winding and/or voltages associated with terminals on the secondary winding before an occurrence of the fault as illustrated at step 86, as well as measuring as fault measured voltages of the measured voltages magnitude of voltages associated with terminals on the primary winding and/or voltages associated with terminals on the secondary winding during the occurrence of the fault condition as illustrated at step 88.

Generally, step 84 includes, as illustrated at step 90, injecting currents into each of the primary terminals of transformer 38 where the magnitude and phase angle of each injected current is adjusted. Based on the fault occurring, magnitude and current injected is typically with respect to the pre-fault voltages as illustrated at step 92. In a preferred embodiment, as indicated at step 94, the fault currents emulate at least some characteristics of the phase-angle response of currents and voltages provided by a generator having rotating magnets or electrical windings to various faults on the power grid 34. In the discussion below various fault conditions and inverter responses are discussed.

Phase-to Ground Fault

Figure 5:
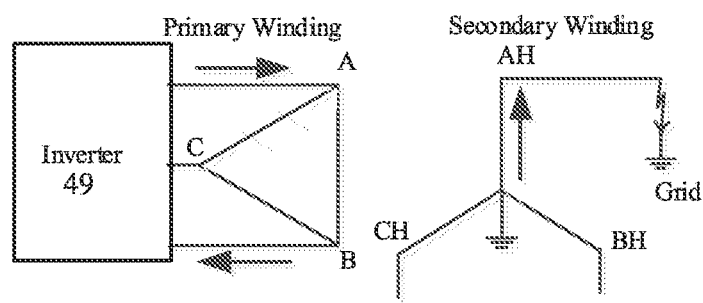
FIGS. 5, 6 and 7 are schematic diagrams of the inverter and a transformer illustrating current flow for different types of faults on the secondary side of the transformer.

FIG. 5 illustrates a phase-to-ground fault on the secondary or high side of transformer 38 (identified with terminals AH, BH and CH). In the event of a fault on the high side of the transformer 38 herein indicated as occurring on the A phase, represented by high-side terminal AH of the transformer 38, phase-to-phase voltage $V_{AB}$ on the secondary side of transformer 38 also collapses to a value that can be approximated to the current times the short-circuit impedance of transformer 38. Under these conditions, the inverter 49 can control power from IBR 32 to produce approximately 1.0 PU current. For example, assuming 0.15 PU impedance of transformer 38, the voltage could collapse from 1.0 PU to 0.15 PU across phase-to-phase AB, while the other phase-to-phase voltages remain above a selected threshold voltage. In this example both $V_{BC}$ and $V_{CA}$ may remain at 1.0 PU.

As exemplified in FIG. 3, system controller 64 monitors voltages 70 ascertaining all three voltages $V_{AB}$, $V_{BC}$, and $V_{CA}$, or monitors voltages 72 ($V_{AHG}$, $V_{BHG}$, and $V_{CHG}$). If one of the phase-to-phase voltages $V_{AB}$, $V_{BC}$, and $V_{CA}$ across one associated pair of primary terminals is below a primary voltage selected level relative to another phase-to-phase voltage across other primary terminals, or one of the phase-to-ground voltages $V_{AHG}$, $V_{BHG}$, and $V_{CHG}$, on the secondary terminals is below a secondary voltage selected level relative to another phase-to-ground voltage on another secondary terminal thereby causing said one of the phase-to-phase voltages $V_{AB}$, $V_{BC}$, and $V_{CA}$ being below the primary voltage selected level, inverter 49 injects currents in the primary terminals of said one of the phase-to-phase voltages $V_{AB}$, $V_{BC}$, and $V_{CA}$ that are 180 degrees out of phase. Using a fault occurring on phase A by way of example, If the phase-to-phase $V_{AB}$ on the primary side of transformer 38 is below the primary voltage selected level, a phase-to-ground fault $V_{AHG}$ is present on the secondary or high side of the transformer 38. In such a condition, the inverter 49 injects current into the A and B phases of transformer 38 that are 180 degrees out of phase with respect to each other.

In a further preferred embodiment, the phase angle of the current injected in the associated primary terminal of a leading phase for said one of the phase-to-phase voltages is adjusted to lag said one of the phase-to-phase voltages by a line angle of the power grid. For a phase-to-ground fault on phase A, by way of example, the phase angle of the current of the leading phase is adjusted to lag the pre-fault voltage, $V_{AB}$, by the line angle, typically around 80 degrees.

Phase-to-Phase Fault or Double Phase-to-Ground Fault

Figure 6:
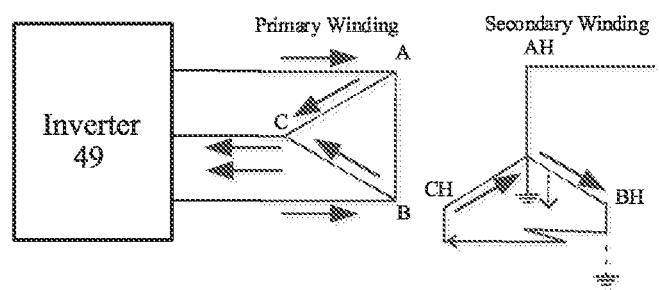

FIG. 6 illustrates a phase-to-phase fault on the high side of transformer 38. Again, system controller 64 monitors voltages 70 ascertaining all three voltages $V_{AB}$, $V_{BC}$, and $V_{CA}$, or monitors voltages 72 ($V_{AHG}$, $V_{BHG}$, and $V_{CHG}$). If two of the phase-to-phase voltages $V_{AB}$, $V_{BC}$, and $V_{CA}$ across associated pairs of primary terminals are each below a primary voltage selected level relative to another phase-to-phase voltage, or two phase-to-ground voltages $V_{AHG}$, $V_{BHG}$, and $V_{CHG}$ on the secondary terminals are below a secondary phase-to-ground voltage selected level relative to another phase-to-ground voltage on the secondary terminals thereby causing said two of the phase-to-phase voltages $V_{AB}$, $V_{BC}$, and $V_{CA}$ across associated pairs of primary terminals to each be below the primary voltage selected level relative to another phase-to-phase voltage, wherein the associated pairs of primary terminals comprise a common terminal, a first non-common terminal and a second non-common terminal, currents injected into the common terminal by the inverter 49 are out of phase and equal to at least a sum of the current injected into the first non-common terminal and second non-common terminal. Using a fault occurring between phase B and C on the secondary side of transformer 38 by way of example, phase voltages $V_{BHG}$, and $V_{CHG}$ will reduce to 0.5 PU and will be almost in phase, while the A phase voltage $V_{AHG}$ will be close to 1.0 PU. On the primary side of the transformer 38, phase-to-phase voltage $V_{AB}$ will stay close to 1.0 PU, whereas $V_{BC}$, and $V_{CA}$ will be below the primary voltage selected level relative to phase-to-phase voltage $V_{AB}$, the associated pairs of primary terminals comprise a common terminal C, a first non-common terminal A and a second non-common terminal B. Currents injected into the common terminal C by the inverter 49 are out of phase and equal to at least a sum of the current injected into the first non-common terminal A and second non-common terminal B.

In a further preferred embodiment, the phase angle of the currents injected in the associated primary terminals of a leading phase for each of said two of the phase-to-phase voltages is adjusted to lag said one of the phase-to-phase voltages by a line angle of the power grid. For a phase-to-phase on phases BH and CH, by way of example, the phase angle of the currents of the leading phase for each of said two of the phase-to-phase voltages adjusted to lag the corresponding pre-fault voltages by the line angle, typically around 80-86 degrees.

Double Phase-to-Ground Fault

FIG. 6 also illustrates a double phase-to-ground fault by the ground symbol being in dashed lines. Again, system controller 64 monitors voltages 70 ascertaining all three voltages $V_{AB}$, $V_{BC}$, and $V_{CA}$, or monitors voltages 72 ($V_{AHG}$, $V_{BHG}$, and $V_{CHG}$. If two of the phase-to-phase voltages $V_{AB}$, $V_{BC}$, and $V_{CA}$ across associated pairs of primary terminals are each below a primary voltage selected level relative to another phase-to-phase voltage, or two phase-to-ground voltages $V_{AHG}$, $V_{BHG}$, and $V_{CHG}$ on the secondary terminals are below a secondary phase-to-ground voltage selected level relative to another phase-to-ground voltage on the secondary terminals thereby causing said two of the phase-to-phase voltages $V_{AB}$, $V_{BC}$, and $V_{CA}$ across associated pairs of primary terminals to each be below the primary voltage selected level relative to another phase-to-phase voltage, wherein the associated pairs of primary terminals comprise a common terminal, a first non-common terminal and a second non-common terminal, currents injected into the common terminal by the inverter 49 are out of phase and little less than the sum (vectorial sum), typically around 80-90% of the sum, of the current injected into the first non-common terminal and second non-common terminal. Using a fault occurring between phase B and C on the secondary side of transformer 38 by way of example, phase voltages $V_{BHG}$, and $V_{CHG}$ will reduce to a value below the selected threshold, 0.5 PU or below and will be almost in phase, while the A phase voltage $V_{AHG}$ will be close to 1.0 PU. On the primary side of the transformer 38, phase-to-phase voltage $V_{AB}$ will stay close to 1.0 PU, whereas $V_{BC}$, and $V_{CA}$ will be below the primary voltage selected level relative to phase-to-phase voltage $V_{AB}$, the associated pairs of primary terminals comprise a common terminal C, a first non-common terminal A and a second non-common terminal B. Currents injected into the common terminal C by the inverter 49 are out of phase and little less than the sum (vectorial sum) of the current injected into the first non-common terminal A and second non-common terminal B.

In a further preferred embodiment, the phase angle of the currents injected in the associated primary terminals of a leading phase for each of said two of the phase-to-phase voltages is adjusted to lag said one of the phase-to-phase voltages by a line angle of the power grid. For a phase-to-phase on phases BH and CH, by way of example, the phase angle of the currents of the leading phase for each of said two of the phase-to-phase voltages adjusted to lag the corresponding pre-fault voltages by the line angle, typically around 80-86 degrees.

Three Phase Fault

Figure 7:
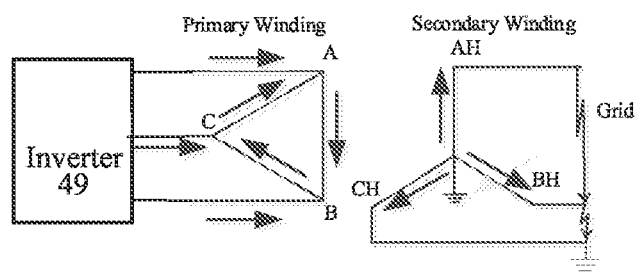

FIG. 7 illustrates a three phase fault on the high side of transformer 38, which could be to ground or not. Again, system controller 64 monitors voltages 70 ascertaining all three voltages VAB, VBC, and VCA, or monitors voltages 72 (VAHG, VBHG, and VCHG). If all of the phase-to-phase voltages VAB, VBC, and VCA across associated primary terminals are below a primary voltage selected level relative to 1.0 per unit, or all of the phase-to-ground voltages VAHG, VBHG, and VCHG on the secondary terminals are below a secondary voltage selected level relative to 1.0 per unit thereby causing all of the phase-to-phase voltages VAB, VBC, and VCA being below the primary voltage selected level, the inverter 49 injects currents in terminals of the primary winding that are substantially equal and 120 degrees apart. Preferably, the injected currents into terminals of the primary winding lag behind corresponding respective pre-fault phase voltages angles by a line angle of the power grid due to the fault condition. Appropriate phase shift due to winding configuration of transformer(s) also need to be considered.

The foregoing discussion is with respect to faults where a transformer having a delta connected primary winding and a wye connected secondary winding such as illustrated in FIG. 2 is present, but this would also apply to the delta-wye transformer in IBR 32A as illustrated in FIG. 2A. Column A in the table below again provides the currents injected in the primary winding for each of the exemplary faults described above.

However, the winding configuration of the primary and secondary windings of the transformer may take other forms. This is illustrated by way of example in FIG. 2A where the transformer directly connected to the inverter of the IBR 32B or 32C may be either of a delta-wye configuration or a wye-wye configuration. As mentioned above, an aspect of the present invention is to emulate at least some characteristics of fault currents provided by a generator having rotating magnets or electrical windings. Therefore, proper emulation should take into account the configuration of the one or more transformers connected between the IBR and the transmission line.

Fault Identification

Before inverter reference currents can be changed, the fault type must be correctly identified explicitly, where for example, the system controller 64 stores a value indicative of the fault that has occurred, or implicitly where the system controller 64 operates based on the measured voltages without explicitly labeling the fault type. As indicated above, this can be accomplished by measuring phase (A-G, B-G. C-G) and line-to-line (A-B, B-C. C-A) voltage magnitudes indicative at the relay location.

In one exemplary embodiment, the type of faults having the following characteristics: (1 PU is the nominal phase to phase voltage.)

Single-Line to Ground
Faulted phase below 0.8 PU.
Healthy phases above 0.8 PU.
Line-to-Line
Both faulted phases below 0.8 PU.
But above 0.4 PU.
Faulted line-to-line below 0.8 PU.
Healthy (unfaulted) phase>0.8 PU.
Double-Line to Ground
Both faulted phases below 0.4 PU.
Faulted line-to-line below 0.8 PU.
Healthy (unfaulted) phase>0.8 PU
Three-Lines to Ground
All phases below 0.8 PU.

In this exemplary embodiment, the 0.8 per-unit threshold was selected because it is significantly below normal operating conditions, and the 0.4 per-unit threshold was selected to differentiate between a line-to-line and double-line-to-ground fault.

The RMS voltage magnitudes used for fault detection are calculated over a one cycle (e.g. 60 Hz) moving window. This can cause a misclassification or misinterpretation of the type of fault occurring, but more importantly, the incorrect currents being injected when a double-line to ground fault occurs, as the voltage magnitudes of the faulted phases briefly meet the line-to-line criteria when they drop below 0.8 per-unit, but before they drop below 0.4 per-unit. A similar misclassification or misinterpretation of the type of fault occurring, resulting in the incorrect current(s) being injected may briefly occur for a three-phase fault as a single-line to ground fault.

In order to avoid misclassification or misinterpretation, it can be advantageous to add a delay of a selected time period such as about W cycle to less than about ½ cycles, more preferably about ½ cycle to about 1 cycle, after a fault is first detected but before the inverter reference currents are changed to allow for the voltage magnitudes to reach appropriate levels for accurate fault detection.

In another embodiment, the voltages on the primary, delta connected transformer windings in any of the transformers connecting the IBR to the power grid can be used. (1 PU is the nominal phase to phase voltage.) The various faults (phase to ground fault, a phase-to-phase fault, a double-phase to ground fault or a three phase fault) can be classified as follows, where a A-G phase to ground fault, B-C phase-to-phase, and B-C-G double-phase to ground fault are provided by way of example:

| Phase to Ground Fault: | (e.g. A-G fault): | VAB < 0.8 PU;<br>VBC > 0.8 PU;<br>VCA > 0.6 PU |
| --- | --- | --- |
| Phase to Phase Fault: | (e.g. B-C fault): | VAB > 0.85 PU;<br>VBC < 0.4 PU;<br>VCA < 0.8 PU |
| Double line to ground Fault: | (e.g. B-C-G fault): | 0.4 < VAB < 0.85 PU;<br>VBC < 0.4 PU;<br>VCA < 0.8 PU |
| Three Phase Fault: | (A-B-C-G fault): | VAB < 0.4 PU;<br>VBC < 0.4 PU;<br>VCA < 0.4 PU. |

A selected delay before injecting the currents such as in the range of about W cycle to less than about 1½ cycles, more preferably about ½ cycle to about 1 cycle, may be advantageous to ensure the measured voltages correspond to the actual fault occurring.

Columns B and C provide suitable characteristics of the of emulated currents injected into the primary windings for each of the exemplary faults discussed above where again, the injected currents are based on measured voltages associated with terminals on one of the primary windings and/or voltages associated with terminals on one of the secondary windings. In the exemplary table of faults below, phase angles are all with respect to phase A-G voltage (Grid Voltage) or at bus 33A in FIG. 2A (same as the voltage on the secondary side of the inverter transformer) or at bus 42 or on the line side of breaker 44A in FIG. 2. The line angle in these exemplary faults is assumed to be 86 degrees, but this line angle is only exemplary and may vary depending on the transmission line to which the IBR inverter is connected. The current magnitudes are in PU of the rated current. It should also be noted for inverter transformers having a delta-wye or wye-delta configuration, current injection remains the same as long as the high voltage (secondary) side of inverter transformer leads the low voltage (primary) side by same angle (30°).

| Fault Type | Configuration | | |
|---|---|---|---|
| | Column A<br>Delta-Wye<br>(Delta is assumed to lag Wye by 30°) | Column B<br>Wye-Wye | Column C<br>Wye-Delta<br>(Delta is assumed to lead Wye by 30°) |
| Single line to Ground (A-G) | Ia = 1.0 @−86°<br>Ib = 1.0 @94°<br>Ic = 0 | Ia = 1.0 @ −86°<br>Ib = 0.5 @ 94°<br>Ic = 0.5 @ 94° | Ia = 1.0 @−86°<br>Ib = 0<br>Ic = 1.0 @94° |
| Line-Line (B-C) | Ia = 0.5@ −176°<br>Ib = 0.5@ −176°<br>Ic = 1.0 @ 4° | Ia = 0 @0°<br>Ib = 1.0 @ −176°<br>Ic = 1.0 @4° | Ia 0.5@ 4°<br>Ib = 1.0@−176°<br>Ic = 0.5 @ 4° |
| Double Line to Ground* (B-C-G) | Ia = 0.5 @−150°<br>Ib = 0.5 @150°<br>Ic = 0.866@0° | Ia = 0.414 @−90°<br>Ib = 0.8@165°<br>Ic = 0.8@ 15° | Ia = 0.5 @ −30°<br>Ib = 0.866 @−180°<br>Ic = 0.5@30° |
| *- Currents are based on a strong remote end ground source | | | |
| Three Phase (without ground and to ground) | Ia = 1.0@−116°<br>Ib = 1.0 @ −236°<br>Ic = 1.0@4° | Ia = 1.0@−86°<br>Ib = 1.0 @ −206°<br>Ic = 1.0@34° | Ia = 1.0@−57°<br>Ib = 1.0 @ −177°<br>Ic = 1.0@ 63° |

Preferably, the magnitude of the current in the foregoing situations is limited at most to the rated current. The primary voltage selected level and the secondary voltage selected level determines the sensitivity of the inverter 49 to fault conditions. In one embodiment, the primary voltage selected level and the secondary voltage selected level is about 0.9 PU, while in a further embodiment the primary voltage selected level and the secondary voltage selected level is about 0.8 PU, the latter of which may be advantageous in that there may be fewer inadvertent operation of the circuit breakers from the protection relay when a fault does not really exist.

However, it should be noted that in operation at the time of the fault, the IBR inverter may not be providing electric power to the grid at 1.0 PU, but rather could be operating at any desired level below 1.0 PU. If the IBR includes an energy storage device such as a battery or is an energy storage device such as a flywheel, the IBR could actually be drawing power from the grid when the fault occurs. In such situations where the IBR is providing power at a level less than 1.0 PU, or is drawing power from the grid, the controller of the IBR upon sensing the afore-mentioned voltages, would immediately switch operation to providing injected currents as described above for at least a duration (for example 0.5 seconds) sufficient to ensure proper of the distance relays. If the IBR is not an energy storage device per se, the inverter can include storage devices such as one or more capacitors to provide the emulated currents for at least a duration (for example 0.5 seconds) sufficient to ensure proper operation of the distance relays.

Referring back to FIG. 3, a protection relay 90 is illustrated. The protection relay 90 receives as inputs the necessary current and voltage signals required to monitor the transmission line to which it has been configured to protect. If desired, it should be noted that the protection relay 90 can be configured to provide an output 94 that is received by the system controller 64 indicative of the type of fault it has detected in the manner as described above with respect to the secondary voltages on the transformer 38. The output 94 can be indicative of the type of fault that the protective relay has seen, i.e. phase-to-ground, phase-to-phase, double phase-to-ground fault or three phase fault as well as which phase or phases are involved. The system controller 64 can process the output from the protective relay 90 and inject currents as indicated above. In an alternative embodiment, the output 94 of the protective relay 90 can comprise the voltages indicative of the secondary voltages (i.e. voltages 72) where the system controller 64 processes these voltages signals as described above. The output 94 can be a direct connection or via a communication interface.

Figure 8:
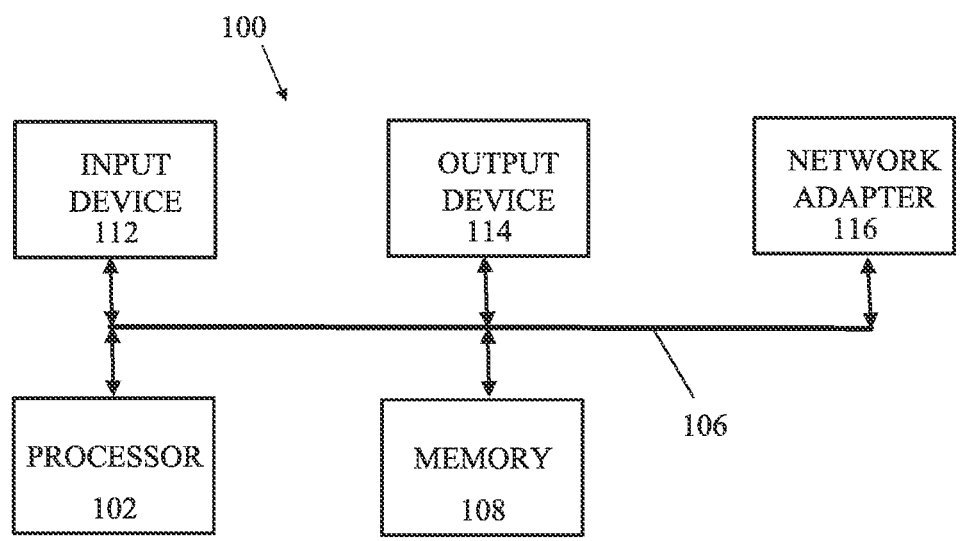
FIG. 8 is a schematic diagram of a computing device.

FIG. 8 is a block diagram illustrating exemplary control and data processing system for embodying the inverter controller 60, the system controller 64 or protection relay 90. System 100 may include at least one processor 102 coupled to memory 108 through a system bus 106. As such, the system may store program code in memory 108. Further, processor 102 may execute the program code accessed from memory 108 via system bus 106. In one aspect, data processing system 100 may be implemented as a computer that is suitable for storing and/or executing program code. It should be appreciated, however, that system 100 may be implemented in the form of any system including a processor and memory that is capable of performing the functions described within this disclosure.

Input/output (I/O) devices depicted as input device 112 and output device 114 optionally can be used with the data processing system 100. Examples of an input device may include, but is not limited to, for example, analog to digital converters connected to the sensors suitable for measuring current and voltage as described above. Other input devices may include user interfaces, for example, a keyboard, but which can also include another computer such as laptop, smartphone or the like. Examples of an output device may include, control circuitry for the electronic switches in electrical switching circuit 50, but also can be a display, monitor, indicator lights or the like.

If desired, a network adapter 116 may also form part of the data processing system 100 to enable it to become coupled to other systems, computer systems, remote network devices, and/or remote storage devices through intervening private or public networks. The network adapter 116 may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 100. Memory elements 108 may store an application 118 for the afore-mentioned controllers. It should be appreciated that data processing system 100 may further execute an operating system (not shown) that can facilitate execution of the application. The application, being implemented in the form of executable program code, can be executed by data processing system 100, e.g., by processor 102.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating an inverter of an inverter-based power resource providing electric power to an electric power grid at normal operating voltages through one or more transformers, each transformer having a primary winding having primary terminals receiving power from the inverter and a secondary winding having secondary terminals providing power to the electric power grid, each terminal having an associated voltage and current, the method comprising:
    measuring voltages associated with terminals on a selected primary winding and/or measuring voltages associated with terminals on a selected secondary winding; and
    injecting currents with the inverter of the inverter-based power resource into the primary terminals of the selected primary winding during a fault condition on the power grid comprising one of a phase to ground fault, a phase-to-phase fault, a double-phase to ground fault or a three phase fault based on the measured voltages to emulate at least some characteristics of fault currents associated with the fault condition provided by a generator having rotating magnets or electrical windings based on measured voltages being voltages associated with terminals on the selected primary winding and/or voltages associated with terminals on the selected secondary winding, and wherein the injected currents lag associated pre-fault measured voltages by line impedance angles of the electric power grid for the fault condition.

2. The method of claim 1 and further comprising ascertaining the fault condition being one of a phase to ground fault, a phase-to-phase fault, a double-phase to ground fault or a three phase fault.

3. The method of claim 1 wherein measuring comprises:
    measuring and storing in memory as pre-fault measured voltages of the measured voltages a magnitude and a phase angle of voltages associated with terminals on the selected primary winding and/or voltages associated with terminals on the selected secondary winding before an occurrence of the fault condition; and
    measuring as fault measured voltages of the measured voltages magnitude of voltages associated with terminals on the selected primary winding and/or voltages associated with terminals on the selected secondary winding during the occurrence of the fault condition.

4. The method of claim 3 wherein injecting currents comprises injecting currents into each of the primary terminals by adjusting magnitude and phase angle of each injected current with respect to the phase angle of the associated pre-fault measured voltage for the fault condition.

5. The method of claim 3 wherein storing comprises storing pre-fault measured voltages in an inverter controller controlling an electrical switching device circuit.

6. The method of claim 3 wherein storing comprises storing pre-fault measured voltages on a device separate from an inverter controller controlling an electrical switching device circuit.

7. The method of claim 1 wherein injecting currents comprises waiting a selected time period upon detection of a drop in at least one of the measured voltages.

8. The method of claim 7 wherein the selected time period is about one cycle.

9. A method of operating an inverter of an inverter-based power resource providing electric power to an electric power grid at normal operating voltages of 1.0 per unit through one or more transformers, each transformer having a primary winding having primary terminals connected to the inverter and a secondary winding having secondary terminals connected to the electric power grid, each terminal having an associated voltage and current, the method comprising:
    measuring voltages associated with terminals on a selected primary winding and/or measuring voltages associated with terminals on a selected secondary winding before and during a fault condition, wherein the measured voltages during the fault condition correspond to one of a phase to ground fault, a phase-to-phase fault, a double-phase to ground fault or a three-phase fault on a side of the transformer having the selected secondary winding;
    identifying a type of fault that has occurred on the electric power grid; and
    controlling the inverter to inject currents into the primary terminals during the fault condition on the power grid to emulate at least some characteristics of fault currents provided by a generator having rotating magnets or electrical windings based on the measured voltages across each pair of terminals on the selected primary winding and/or measured voltages on each secondary terminal on the selected secondary winding, wherein controlling the inverter comprises adjusting a magnitude and/or phase angle of one or more phase currents relative to one or more respective phase voltages from the inverter, and wherein the injected currents lag associated pre-fault measured voltages by line impedance angles of the electric power grid for the fault condition.

10. An apparatus comprising:
    an electrical switching device circuit having input terminals for an inverter-based power resource and output terminals for providing multi-phase AC electric power to an electric power grid; and
    an inverter controller connected to the electrical switching device circuit and configured to operate the electrical switching device circuit to generate injected currents from the output terminals that emulate during an unbalanced fault condition at least some characteristics of fault currents being one of a phase to ground fault, or a phase-to-phase fault, and wherein the injected currents are based on the fault currents lagging the associated voltages by line impedance angles of the electric power grid for the unbalanced fault condition; and a system controller connected to the inverter controller and having voltage input terminals, the system controller configured to control the inverter controller during the unbalanced fault condition based on pre-fault measured voltages provided at the voltage input terminals, wherein the system controller is configured to control the inverter controller such that if one phase-to-phase voltage across the voltage input terminals is below a primary voltage selected level relative to another phase-to-phase voltage across the voltage input terminals, or one phase-to- ground voltages on the voltage input terminals is below a secondary voltage selected level relative to another phase-to-ground voltage on the voltage input terminals, wherein the inverter controller is configured to provide currents out of two of the output terminals that are 180 degrees out of phase.

11. The apparatus of claim 10 wherein the fault currents emulate at least some characteristics of a generator having rotating magnets or electrical windings providing the fault currents.

12. The apparatus of claim 10 wherein the inverter controller or the system controller is configured to delay the operation of switching devices of the switching device circuit for a selected time period.

13. The apparatus of claim 10 wherein the system controller is configured to control the inverter controller based on pre-fault measured voltages at the voltage input terminals corresponding to a double-phase to ground fault or a three phase fault on a power system connected to the output terminals.

14. The apparatus of claim 13 wherein the system controller is configured to control the inverter controller to adjust one or more phase currents from the electrical switching device circuit during the unbalanced fault condition on the power grid.

15. The apparatus of claim 14 wherein the system controller is configured to control the inverter controller to adjust a magnitude and/or phase angle of the one or more phase currents relative to one or more respective phase voltages from the electrical switching device circuit.

16. The apparatus of claim 15 wherein the system controller is configured to control the inverter controller such that if all phase-to-phase voltages across the voltage input terminals is below a primary voltage selected level, or all phase-to- ground voltages on the voltage input terminals is below a secondary voltage, the inverter controller is configured to provide currents that are substantially equal and 120 degrees apart.

17. The apparatus of claim 15 wherein the system controller is configured to control the inverter controller such that if two of the phase-to-phase voltages across associated pairs of the voltage input terminals are each below a primary voltage selected level relative to another phase-to-phase voltage across the voltage input terminals, or two phase-to-ground voltages on the voltage input terminals are below a secondary voltage selected level relative to another phase-to-ground voltage on the voltage input terminals, the inverter controller is configured to provide currents out of two of the output terminals that is a sum the current into a remaining terminal of the output terminals.

18. The apparatus of claim 17 wherein the current provided out of each of the two of the output terminals is equal.

* * * * *